(12) United States Patent
Mohrlock et al.

(10) Patent No.: US 10,144,258 B2
(45) Date of Patent: Dec. 4, 2018

(54) WHEEL SUSPENSION FOR A VEHICLE AXLE

(71) Applicant: AUDI AG, Ingolstadt (DE)

(72) Inventors: Dominik Mohrlock, Buxheim (DE); Ruben Goldberg, Ingolstadt (DE); Tobias Kramer, Stammham (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/741,643

(22) PCT Filed: Jul. 13, 2016

(86) PCT No.: PCT/EP2016/001212
§ 371 (c)(1),
(2) Date: Jan. 3, 2018

(87) PCT Pub. No.: WO2017/012702
PCT Pub. Date: Jan. 26, 2017

(65) Prior Publication Data
US 2018/0194183 A1    Jul. 12, 2018

(30) Foreign Application Priority Data

Jul. 18, 2015  (DE) .......................... 10 2015 009 311

(51) Int. Cl.
*B60G 7/00* (2006.01)
*B60G 3/20* (2006.01)

(52) U.S. Cl.
CPC .............. *B60G 7/001* (2013.01); *B60G 3/20* (2013.01); *B60G 7/006* (2013.01);
(Continued)

(58) Field of Classification Search
CPC .......... B60G 7/001; B60G 7/006; B60G 3/20; B60G 2200/144; B60G 2204/422;
(Continued)

(56) References Cited

U.S. PATENT DOCUMENTS 2,253,666 A * 8/1941 Wagner .................... B60G 3/20
                                                         267/254
2,760,787 A * 8/1956 Muller ..................... B60G 3/14
                                                         267/221

(Continued)

FOREIGN PATENT DOCUMENTS

DE    2845345 A1    4/1980
DE    4326668 A1    2/1995
(Continued)

OTHER PUBLICATIONS

International Preliminary Report on Patentability dated Feb. 1, 2018 of corresponding International application No. PCT/EP2016/001212; 6 pgs.
(Continued)

*Primary Examiner* — Darlene P Condra
(74) *Attorney, Agent, or Firm* — Maier & Maier, PLLC

(57) ABSTRACT

A wheel suspension for a vehicle axle, in particular a front axle, of a two-track vehicle, having a wheel carrier carrying a vehicle wheel, this carrier being linked via a link assembly to a vehicle body, which link assembly has at least two links that are linked to the wheel carrier at bearing points on the side of the wheel carrier and to the vehicle body at bearing points on the body side. In the event of a head-on collision, in particular with a small lateral overlap, the vehicle wheel can be shifted rearwards in the longitudinal direction of the vehicle, and specifically with a pivoting movement of the crash-facing first link and with deformation of the crash-remote second link.

10 Claims, 3 Drawing Sheets

(52) U.S. Cl.
CPC .... *B60G 2200/144* (2013.01); *B60G 2200/18* (2013.01); *B60G 2204/143* (2013.01); *B60G 2204/418* (2013.01); *B60G 2204/422* (2013.01); *B60G 2204/45* (2013.01); *B60G 2204/46* (2013.01); *B60G 2206/016* (2013.01); *B60G 2206/11* (2013.01)

(58) Field of Classification Search
CPC ........ B60G 2204/418; B60G 2206/016; B60G 2204/143
See application file for complete search history.

(56) References Cited

U.S. PATENT DOCUMENTS

| | | | | |
|---|---|---|---|---|
| 2010/0201086 | A1* | 8/2010 | Sagara | B60G 3/20 280/5.522 |
| 2014/0042722 | A1* | 2/2014 | Lam | B62D 7/18 280/93.512 |
| 2015/0102592 | A1* | 4/2015 | Kerstan | B60B 35/00 280/784 |
| 2015/0183286 | A1* | 7/2015 | Bruehl | B60G 3/20 280/124.135 |
| 2016/0236529 | A1* | 8/2016 | Sakaguchi | B60G 7/001 |

FOREIGN PATENT DOCUMENTS

| | | |
|---|---|---|
| DE | 19542496 C1 | 10/1996 |
| DE | 102004021165 A1 | 11/2005 |
| DE | 102013016767 A1 | 8/2014 |
| DE | 102013204569 A1 | 9/2014 |
| DE | 102013207144 A1 | 10/2014 |
| EP | 0803383 A2 | 10/1997 |
| JP | 2008-254568 A | 10/2008 |
| JP | 2009-208556 A | 9/2009 |
| JP | 2013-35360 A | 2/2013 |
| JP | 2014-008938 A | 1/2014 |
| JP | 2015-120469 A | 7/2015 |
| WO | 2015/010766 A1 | 1/2015 |

OTHER PUBLICATIONS

International Search Report dated Oct. 18, 2016 of corresponding International application No. PCT/EP2016/001212; 7 pgs.
Written Opinion dated Oct. 18, 2016 of corresponding International application No. PCT/EP2016/001212; 11 pgs.
Examination Report dated Jan. 4, 2016 of corresponding German application No. 102015009311.8; 10 pgs.

* cited by examiner

WHEEL SUSPENSION FOR A VEHICLE AXLE

FIELD

The invention relates to a wheel suspension for a vehicle axle, in particular a front axle, of a two-track vehicle.

BACKGROUND

In a small overlap crash test, the collision occurs with the collision obstacle with small lateral overlap. In this case, the impact forces in the crosswise or transverse direction of the vehicle, at least partially outside the front-side transverse carrier of the vehicle, are introduced directly into the front wheel that faces the crash. The wheel rim of the front wheel in the longitudinal direction of the vehicle is thus shifted backward in the direction of a vehicle passenger's foot space, so that there is the danger of an intrusion into the vehicle passenger's foot space.

DE 43 26 668 A1 shows a device on passenger vehicles that serves for the safety of passengers in the case of accidents, wherein the device is composed of elements provided in or on the vehicle body, these elements distributing energy that is dangerous for passengers in the longitudinal direction and/or in the crosswise direction onto opposite-lying regions of the body and chassis.

JP 2013-35360 A describes a front structure for a vehicle, comprising a pair of lower links having a bent first arm, on the front part of which are arranged a front and a back fastening part, and the middle part of which, as viewed in the longitudinal direction of the vehicle, runs directed outward opposite the front and the back fastening parts, and having a second arm that extends outward from the front part of the first arm, as well as an axle carrier having two lateral longitudinal carriers, on each of which the front and back fastening parts are arranged. The longitudinal carriers are designed in such a way that they buckle under load in the case of a crash.

DE 28 45 345 A1 discloses an independent front wheel suspension for motor vehicles having at least one wheel guide member that has a longitudinal link running in the longitudinal direction of the vehicle against the front wall or bulkhead of the vehicle and in the region thereof, wherein an element that is deformable under pressure with predetermined deformation characteristic is provided as the longitudinal link.

DE 10 2013 204 569 A1 shows a vehicle comprising a carrying structure and a plurality of wheels arranged on the carrying structure by means of suspension elements, wherein at least one suspension element is designed as a support element for supporting at least one wheel counter to the direction of travel of the vehicle, wherein the at least one suspension element designed as a support element is arranged pivotable on the carrying structure, so that in case of a vehicle crash, the at least one wheel can be pivoted out at least partially from a wheel space in which the wheel is arranged during normal operation of the vehicle.

A generic wheel suspension for a vehicle front axle is known from the generic DE 10 2013 016 767 A1. This suspension is composed of a wheel carrier that carries a vehicle wheel and a link assembly that connects the wheel carrier with the vehicle body in an articulated manner. In a lower link plane of the link assembly, two links are arranged in the longitudinal direction of the vehicle, disposed one behind the other: that is, in the event of a crash, a straight two-point transverse link facing the crash and a rear sickle-shaped two-point longitudinal link facing away from the crash. In the above-defined crash case, the front wheel is shifted rearwards in the longitudinal direction of the vehicle, and specifically under a pivoting movement of the crash-facing transverse link and with deformation of the longitudinal link facing away from the crash. The transverse link is designed so that it breaks off at its bearing point on the vehicle-body side in the further course of the crash. It is brought about in this way that in the following course of the crash, the wheel carrier along with the front wheel are pivoted around a front-side bearing point of the longitudinal link facing away from the crash, whereby the vehicle wheel is shifted to outside the vehicle. In this way, an intrusion of the front wheel rim into the vehicle passenger's foot space is avoided.

SUMMARY

As mentioned above, two-point links are in use in this resolved link assembly. In comparison to three-point links, two-point links offer more degrees of freedom in the configuration of the kinematics of the wheel suspension. Unlike two-point links, however, three-point links are supported on two bearing points that are distanced from one another on the vehicle-body side. Based on the enlarged vehicle-body side support base in comparison to the two-point link, this results in an improved crash behavior. Such three-point links, however, are disadvantageous with respect to the configuration of the kinematics of the wheel suspension.

The object of the invention is to provide a wheel suspension for a vehicle axle that makes possible an improved crash performance in a simple way in comparison to the prior art.

According to the present invention, between the first link and the second link is arranged at least one additional element, which brings about a block formation in the crash case defined above, in which the two links and the additional element are joined together in a force-transmitting manner in the longitudinal direction of the vehicle. In this way, the first and second links are mutually supported in the event of a crash. Such a block formation counteracts the crash-caused pivoting movement of the crash-facing first link and the deformation of the crash-remote second link. In this way, in comparison to the above prior art, an essentially larger fraction of the crash energy can be introduced into the vehicle body via the link assembly. The first and second links and the additional element that are shifted together into a block in the event of a crash act like a three-point link that has an essentially greater support base on the vehicle-body side when compared to a two-point link in the event of a crash, whereby the crash performance is improved in comparison to the prior art.

The additional element can be linked in any way to the first link and/or to the second link and/or to an adjacent part of the chassis. In normal driving, the additional element can be without function, that is, does not enable a force-transmitting connection between the first link and the second link. This means that in normal driving, the additional element is distanced preferably by a clearance from the first link and/or from the second link.

In a technical implementation, the additional element can be a materially integrated and/or one-piece component of the first link or of the second link. For example, the additional element can be made of plastic, in particular of a fiber-reinforced plastic, which is molded on the first link or on the second link.

In an enhancement of the invention, the bearing point on the vehicle-body or wheel-carrier side of the crash-facing first link can be designed so that it ruptures in the further crash course after the block formation has been produced. In this case, the block-forming modular unit, composed of the two links and the additional element connected in between is pivotable around the bearing point of the crash-remote link on the vehicle-body side. Due to this pivoting movement along a circular path, there results a transverse shifting of the vehicle wheel to outside the vehicle, which is of advantage with respect to passenger safety.

The additional element and the first/second link may have contact surfaces facing one another that are distanced from one another by the clearance during normal driving, but are joined together in the event of a crash. With respect to a perfect transmission of force in the case of a crash, the contact surfaces facing each other have additional form-fitting contours that increase the engagement between the additional element and the first/second links.

More preferably, the first and second links are each designed as two-point links. In this way, in the construction of the wheel suspension, additional degrees of freedom result for designing the kinematics of the wheel suspension. On the other hand, in the event of a crash, both two-point links together with the additional link act like a three-point link that has an improved crash performance, based on the enlarged support base on the vehicle-body side, in comparison to a two-point link.

In a concrete technical embodiment variant, the first link and the second link can be arranged in a lower link plane of the link structure. The first link can be used as a transverse link essentially aligned in the transverse direction of the vehicle.

The rear second link can be used as a longitudinal link, which is essentially aligned in the longitudinal direction of the vehicle.

In an upper link plane, the link assembly can also have two additional links and a tie rod that is connected to a linking mechanism.

The advantageous embodiments and/or enhancements of the invention as explained above and/or represented in the dependent claims may be applied individually or, however, also in any combination with each other—except, for example, in cases of clear dependences or non-combinable alternatives.

BRIEF DESCRIPTION OF THE DRAWING

The invention and its advantageous embodiments and enhancements as well as the advantages thereof will be explained in more detail below based on the drawings.

Herein:

In a view from above, FIG. 1 shows a wheel suspension that is installed in a vehicle front axle for linked front wheels 1 of a two-track motor vehicle. The wheel suspension is installed mirror-symmetrically in the front axle on opposite-lying sides with respect to a longitudinal central axis of the vehicle.

As is evident from FIG. 1, the wheel suspension has a wheel carrier 3 that carries a front wheel 1. The wheel carrier is linked at an auxiliary frame assigned to the vehicle body 7 via a resolved link assembly. In FIG. 1, the link assembly has a total of five links, which are arranged in an upper link plane and in a lower link plane. A front two-point transverse link 9 and a rear two-point longitudinal link 11 are arranged in the direction of travel FR. The two lower links 9, 11 are linked at bearing points 13 on wheel carrier 3 on the side of the wheel carrier, and at bearing points 15 on the auxiliary frame, which is a component of the vehicle body 7, on the side of the body. In its upper link plane, the link assembly has the links 17, 19, and a tie rod 21, which is coupled with a linking mechanism and which is linked to the wheel carrier 3 at a bearing point 13 on the side of the wheel carrier 3. In FIG. 1, the front wheel 1 is shown without linking lock and is positioned in an indicated wheel housing 23 of the vehicle on the chassis side.

The transverse link 9 essentially extends linearly in the transverse direction y of the vehicle between the vehicle body 7 and the wheel carrier 3. In contrast to this, the longitudinal link 11 is not linear, but rather it is formed angled or sickle-shaped, and in comparison to the transverse link 9, is aligned in the longitudinal direction x of the vehicle.

Figure 1:
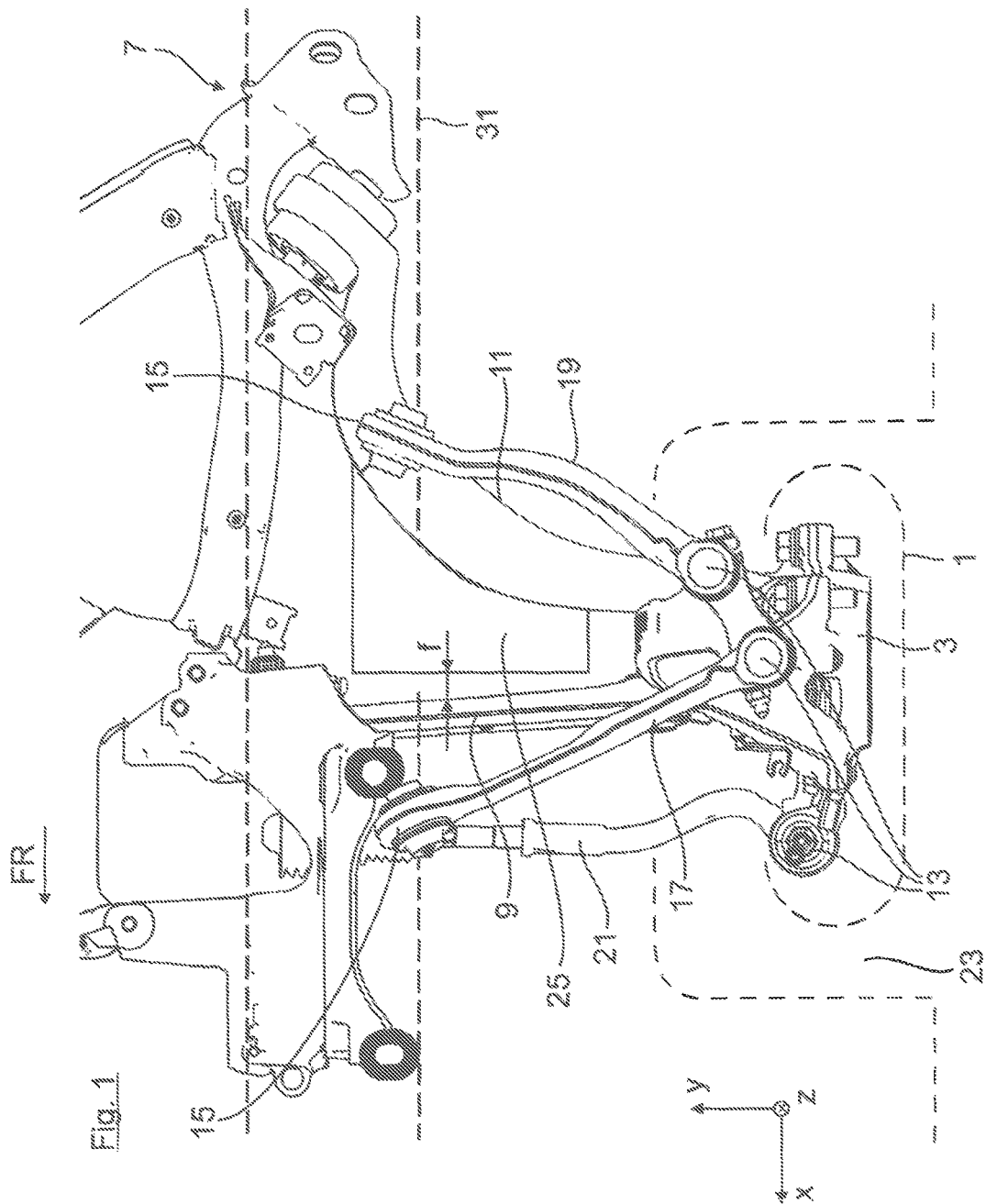
FIG. 1 shows a wheel suspension in a vehicle front axle in a partial view from above.

As is further seen from FIG. 1, the two-point transverse link 9 is designed with an additional element 25 having a large surface area formed as a thrust field. The additional element 25 brings about a block formation in the event of a crash, as will be described later based on FIGS. 2 and 3, in which the two links 9, 11, and the intermediately connected additional element 25 are joined together in a force-transmitting manner in the longitudinal direction x of the vehicle.

As can be further seen from FIG. 1, the additional element 25 extends inside a free space spanned between the two links 9, 11 and in the lower link plane, which is favorable with respect to required installation space. In normal driving operation, which is illustrated, the additional element 25 is distanced from the first link 9 by a clearance f, i.e., connected without function.

Figure 2:
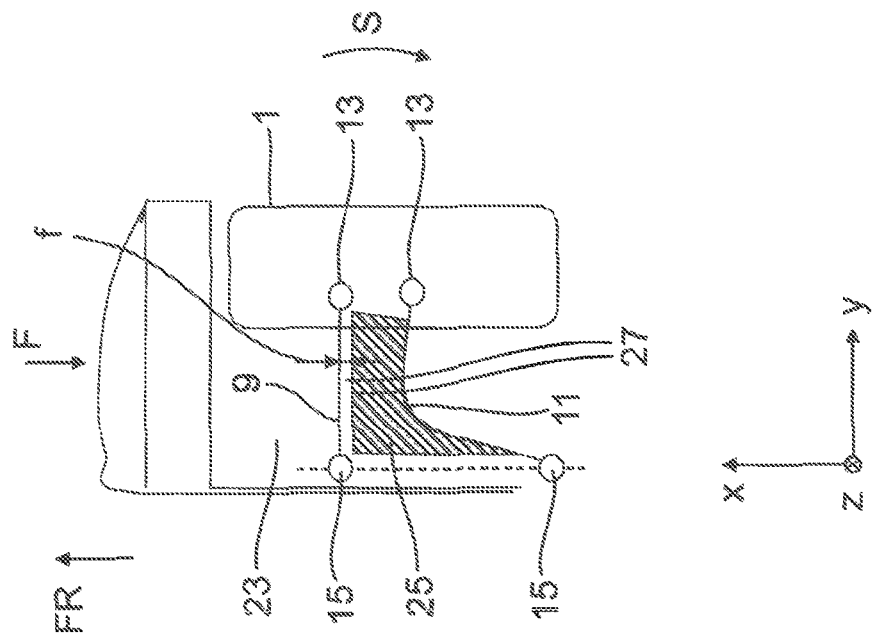
FIG. 2 show a view that illustrates a crash course in a lower link plane of the wheel suspension shown in FIG. 1.

The additional element 25 is only activated in the event of a collision, as is explained below on the basis of FIGS. 2 and 3, which show the two lower transverse and longitudinal links 9, 11 in a very simplified substitution model. In FIG. 2 an initial position is shown, i.e., a normal driving operation, in which the wheel carrier 3 is not impacted. Consequently, the additional element 25 formed at transverse link 9 is distanced from the transverse link 9 by the clearance f. In the case of a head-on crash with slight lateral overlap, the impact forces F act on the wheel carrier 3. The wheel carrier 3 is thus shifted backwards thereby, and there occurs a pivoting movement S of the crash-facing transverse carrier 9 with simultaneous deformation of the crash-remote longitudinal link 11.

Based on the pivoting movement S of the transverse link 9 as well as the deformation of the longitudinal link 11, the two lower links 9, 11, by breaching the clearance f, move toward each other up to the additional element 25, which comes to a stop with the transverse link 9. This brings about a block formation in which the two links 9, 11 and the additional element 25 are joined together in a force-transmitting manner in the longitudinal direction x of the vehicle. This block formation counteracts a further pivoting movement S of the transverse link 9 as well as a further deformation of the longitudinal link 11. In this way, a further backward shifting of the front wheel rim is prevented or delayed.

Figure 3:
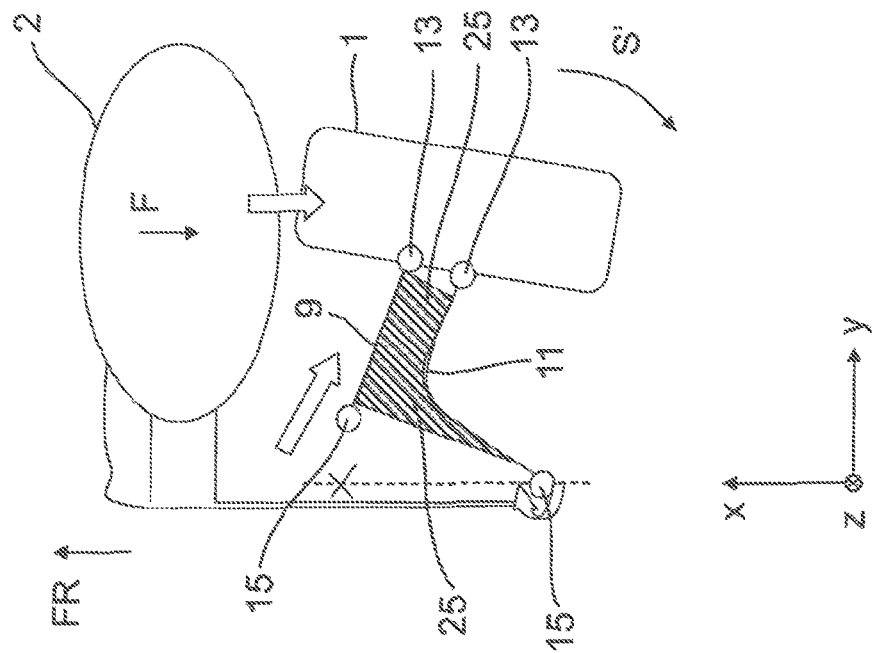
FIG. 3 show another views that illustrate a crash course in a lower link plane of the wheel suspension shown in FIG. 1.

According to FIG. 3, the bearing point 15 of the transverse link 9 on the side of the vehicle body is designed so that it breaks after the block formation has been produced in the further crash course. In this way, the transverse link 9 is decoupled from the vehicle body 7 and, together with the longitudinal link 11 and the wheel carrier 3, pivots about the body-side bearing point 15 of the longitudinal link 11. This pivoting movement S' is produced with simultaneous crosswise shifting of the front wheel 1 toward the outside of the vehicle.

Figure 4:
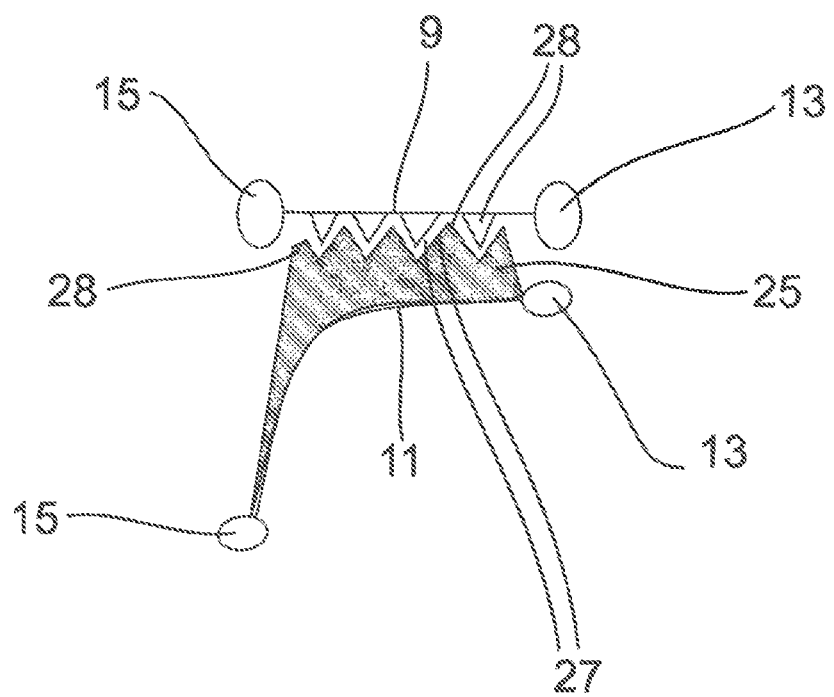
FIG. 4 shows another example of embodiment of the invention in a schematic view.

In FIG. 2, the additional element 25 and the transverse link 9 have contact surfaces 27 facing one another, which are distanced from one another by the clearance f during normal driving operation. According to FIG. 4, the contact surfaces 27 of the transverse link 9 and of the additional element 25 facing one another are formed with serrated contours 28, each of which is structured complementary to the other. In this way, in the event of a crash, a form-fit results between the contact surfaces 27, with which the engagement between the additional element 25 and the transverse link 9 is increased.

The invention claimed is:

1. A wheel suspension for a vehicle axle of a two-track vehicle, comprising:
a wheel carrier carrying a vehicle wheel, this carrier being linked via a link assembly to a vehicle body, which link assembly has at least two links, including a first link which is a crash-facing first link and a second link which is a crash-remote second link, that are linked to the wheel carrier at bearing points on the side of the wheel carrier and to the vehicle body at bearing points on the body side, wherein in the event of a head-on collision, the vehicle wheel can be shifted rearwards in the longitudinal direction of the vehicle, and specifically with a pivoting movement of the crash-facing first link and with deformation of the crash-remote second link wherein an additional element is arranged between the first link and the second link, said element, in the event of a crash, bringing about a block formation in which the two links and the additional element are joined together in a force-transmitting manner in the longitudinal direction of the vehicle, wherein the block formation counteracts the pivoting movement of the crash-facing first link and the deformation of the crash-remote second link.

2. The wheel suspension according to claim 1, wherein the additional element is linked at the first link and/or at the second link and/or at an adjoining part of a chassis or component fixed to the vehicle.

3. The wheel suspension according to claim 1, wherein during normal driving operation, the additional element is without function such that a force-transmitting connection between the first and second links is not made possible, and/or during normal driving operation, the additional element is distanced from the first and/or second link(s) by a clearance.

4. The wheel suspension according to claim 1, wherein the additional element is a material-integrated and/or one-piece component of the first or second link, and/or the additional element is made of plastic that is molded to the first or second link.

5. The wheel suspension according to claim 1, wherein the bearing point on the wheel-carrier side or the bearing point on the vehicle-body side of the crash-facing first link is designed so that after the block formation, it breaks in the further course of the crash, whereby the wheel carrier together with the crash-remote second link execute another pivoting movement about the bearing point of the crash-remote second link on the body side, and specifically with a crosswise shifting of the vehicle wheel toward the outside of the vehicle.

6. The wheel suspension according to claim 3, wherein the additional element and the first link or the second link have contact surfaces facing one another, these surfaces being distanced from one another by the clearance during normal vehicle operation, and, in the event of a crash, are joined to one another in an abutment link, and the contact surfaces facing one another have form-fitting contours that increase the engagement between the additional element and the first/second link.

7. The wheel suspension according to claim 1, wherein the first link and the second link are two-point links.

8. The wheel suspension according to claim 1, wherein the first link and the second link are arranged in a lower link plane of the link assembly, and the first link is applied as a linear transverse link aligned essentially in the transverse direction of the vehicle, and the second link is applied as a sickle-shaped longitudinal link that is aligned essentially in the longitudinal direction of the vehicle.

9. The wheel suspension according to claim 1, wherein the first link and the second link are arranged in an upper link plane of the link assembly, and the first link is found in front of the second link in the direction of travel, and this arrangement is implemented alone or in addition to a block formation in the lower link plane.

10. The wheel suspension according to claim 9, wherein the second link is additionally found behind the center of the wheel.

* * * * *